United States Patent
Patberg et al.

(10) Patent No.: US 9,783,235 B2
(45) Date of Patent: Oct. 10, 2017

(54) PROTECTIVE APPARATUS FOR ARRANGING IN THE FRONT OR REAR REGION OF A MOTOR VEHICLE, HAVING AN UNDERBODY MADE FROM FIBER REINFORCED PLASTIC

(71) Applicants: THYSSENKRUPP STEEL EUROPE AG, Duisburg (DE); TECHNISCHE UNIVERSITÄT DRESDEN, Dresden (DE); LEICHTBAU-ZENTRUM SACHSEN GMBH, Dresden (DE)

(72) Inventors: Lothar Patberg, Moers (DE); Stefan Mayer, Schwerte (DE); Torsten Krahnert, Fritzlar (DE); Werner Hufenbach, Dresden (DE); Enrico Ladusch, Dresden (DE); Jens Werner, Coswig (DE); André Kießling, Dresden (DE); Alexander Herbig, Dresden (DE); Jörn Kiele, Dresden (DE); Martin Lepper, Dresden (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/897,065

(22) PCT Filed: May 21, 2014

(86) PCT No.: PCT/EP2014/060473
§ 371 (c)(1),
(2) Date: Dec. 9, 2015

(87) PCT Pub. No.: WO2014/198508
PCT Pub. Date: Dec. 18, 2014

(65) Prior Publication Data
US 2016/0129940 A1    May 12, 2016

(30) Foreign Application Priority Data

Jun. 12, 2013   (DE) .................. 10 2013 106 080

(51) Int. Cl.
*B62D 25/00*       (2006.01)
*B62D 21/15*       (2006.01)
(Continued)

(52) U.S. Cl.
CPC .......... *B62D 21/15* (2013.01); *B60R 13/0861* (2013.01); *B62D 25/2072* (2013.01); *B62D 29/041* (2013.01); *B62D 35/02* (2013.01)

(58) Field of Classification Search
CPC ............ B62D 55/0845; B62D 55/0847; B62D 55/088; B62D 55/0882
(Continued)

(56) References Cited

U.S. PATENT DOCUMENTS

| 5,501,290 A * | 3/1996 | Volz ................. F16N 31/006 |
| | | 180/69.1 |
| 6,202,778 B1 * | 3/2001 | Mistry ................... B60R 19/00 |
| | | 180/69.1 |

(Continued)

FOREIGN PATENT DOCUMENTS

| CN | 1330006 A | 1/2002 |
| DE | 196 13 446 A1 | 10/1997 |

(Continued)

OTHER PUBLICATIONS

German Language International Search Report for International patent application No. PCT/EP2014/060473; dated Oct. 8, 2014.
(Continued)

*Primary Examiner* — Toan To
(74) *Attorney, Agent, or Firm* — thyssenkrupp North America, Inc.

(57) ABSTRACT

The present disclosure relates to a protective apparatus that can be positioned along an underside of a motor vehicle and, in many cases, near a front or rear region of the motor vehicle. The protective apparatus may include an underbody made from fiber-reinforced plastic for protecting assemblies or components arranged above it against damage as a consequence of stone chipping or ground contact. Further, the underbody may have three-dimensionally structured regions for increasing its rigidity, and the underbody may be designed to absorb chassis and/or crash loads and may include integrated holders for movably attaching chassis links.

16 Claims, 2 Drawing Sheets

(51) Int. Cl.
    *B62D 35/02* (2006.01)
    *B60R 13/08* (2006.01)
    *B62D 25/20* (2006.01)
    *B62D 29/04* (2006.01)

(58) Field of Classification Search
    USPC ............. 180/69.1; 296/204, 38; 280/124.109
    See application file for complete search history.

(56) References Cited

U.S. PATENT DOCUMENTS

| | | | | |
|---|---|---|---|---|
| 6,435,577 B1* | 8/2002 | Renault | ................... | B60R 19/12 |
| | | | | 180/69.1 |
| 8,579,361 B2* | 11/2013 | Takeuchi | ............... | B62D 35/02 |
| | | | | 296/185.1 |
| 2001/0054831 A1 | 12/2001 | Akasaka | | |
| 2002/0050413 A1* | 5/2002 | Renault | ................... | B62D 21/11 |
| | | | | 180/69.1 |
| 2009/0179461 A1 | 7/2009 | Fuchs et al. | | |
| 2014/0332292 A1* | 11/2014 | Gopalsamy | ............... | E02F 9/24 |
| | | | | 180/9.42 |

FOREIGN PATENT DOCUMENTS

| | | |
|---|---|---|
| DE | 10239201 A1 | 3/2004 |
| DE | 10 2005 052 041 A1 | 6/2006 |
| DE | 10 2007 021 216 A1 | 2/2008 |
| DE | 10 2007 053 569 A1 | 5/2009 |
| DE | 10 2010 054 694 A1 | 6/2012 |
| DE | 10 2011 121 572 A1 | 3/2013 |
| EP | 1 415 896 A2 | 5/2004 |
| EP | 2 612 803 A1 | 7/2013 |
| FR | 2 482 548 A1 | 11/1981 |
| JP | 2008-068720 A | 3/2008 |
| WO | 2012/029115 A1 | 3/2012 |

OTHER PUBLICATIONS

English translation of International Search Report for International patent application No. PCT/EP20141060473; dated Oct. 8, 2014.
English translation of the abstract of DE 10 2010 054 694 A1.
English translation of the abstract of DE 196 13 446 A1.
English translation of the abstract of DE 10 2007 021 216 A1.
English translation of the abstract of DE 10 2007 053 569 A1.
English translation of the abstract of FR 2 482 548 A1.
English translation of the abstract of DE 10 2011 121 572 A1.
English translation of the abstract of DE 10 2005 052 041 A1.
English language Abstract of DE 102 39 201 A1 listed above.
English language Abstract of JP 2008-068720 A listed above.

* cited by examiner

PROTECTIVE APPARATUS FOR ARRANGING IN THE FRONT OR REAR REGION OF A MOTOR VEHICLE, HAVING AN UNDERBODY MADE FROM FIBER REINFORCED PLASTIC

CROSS REFERENCE TO RELATED APPLICATIONS

This application is a U.S. National Stage Entry of International Patent Application Serial Number PCT/EP2014/060473, filed May 21, 2014, which claims priority to German Patent Application No. DE 102013106080.3filed Jun. 12, 2013, the entire contents of both of which are incorporated herein by reference.

FIELD

The present disclosure relates to fiber-reinforced protective apparatus for protecting assemblies and/or components of motor vehicles from damage from stone chipping, ground contact, or the like.

BACKGROUND

An apparatus of the generic type which is known from DE 10 2007 053 569 A1 comprises a large-area covering part made from fiber-reinforced plastic as underbody. The covering part is placed against load-bearing components of the vehicle body and is connected fixedly thereto. The fiber-reinforced plastic is configured by way of a thermoplastic matrix with at least one mat-shaped woven fabric layer which is embedded at least partially in the regions of increased loads of the covering part. Here, the mat-shaped woven fabric layer can be supplemented by reinforcing fibers which are additionally embedded into the plastic matrix, it being possible for the woven fabric layer and any additional reinforcing fibers to be formed by directional and/or non-directional endless fibers and/or cut fibers in a manner which is dependent on the loads to be expected. Glass and carbon fibers, in particular, are mentioned as reinforcing fibers. Furthermore, at its front and rear end, the covering part has in each case one bead-shaped profiling which forms a support which is as rigid as possible and extends in the vehicle transverse direction. Said profilings are provided with screw points for fixing the covering part firstly to a subframe and secondly to two longitudinal carriers which are arranged on both sides of the motor vehicle body. Furthermore, the covering part has webs which are set apart laterally and on which further screw points are provided which for their part serve for the fixed connection of the covering part on the front wheel housings.

The automotive industry has been concerned for a relatively long time with producing lighter body and chassis components with comparable or improved mechanical properties in an inexpensive manner. This development is based on the aim of lower fuel consumption and reduced pollutant emissions, in particular of $CO_2$. Light body components with a satisfactory crash behavior are given great significance, in particular also with regard to electric vehicles, if the aim is to improve the range and/or acceleration of vehicles of this type.

BRIEF DESCRIPTION OF THE FIGURES

FIG. 1 is a perspective view of an example fiber-reinforced underbody that can be arranged on a motor vehicle to protect a variety of assemblies and components above it from stone chipping, liquid media, and the like.

DETAILED DESCRIPTION

Figure 1:
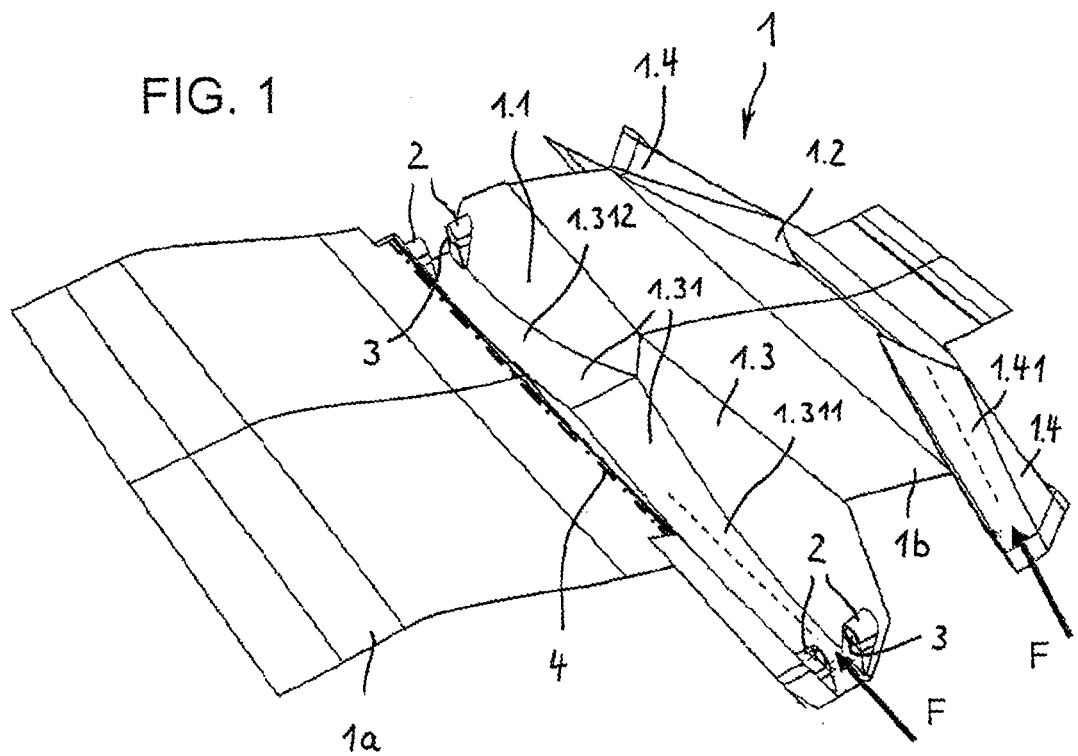

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present invention was based on the object of providing an apparatus of the type mentioned at the outset which, at a low weight, has a high rigidity for absorbing operating and crash loads, can be manufactured inexpensively and affords the possibility of a further reduction in the vehicle weight with comparable or improved mechanical properties.

According to the invention, this object is achieved by way of an apparatus having the features of claim 1. Preferred and advantageous refinements of the apparatus according to the invention result from the features of the subclaims.

The apparatus according to the invention is distinguished by the fact that the underbody is designed to absorb chassis and/or crash loads and has integrated holders for movably attaching chassis links.

The apparatus according to the invention is based on the concept of integrating additional functions or part functions into a vehicle underbody which usually serves only or primarily to protect the engine compartment and the assemblies arranged therein against damage as a consequence of stone chipping, ground contact and the like, in order to achieve a reduction in the vehicle weight as a result with comparable or improved mechanical properties. The underbody of the apparatus according to the invention serves, in particular, to absorb and transmit shearing forces. It can therefore also be called a shear area.

It has been recognized by the inventors that the vehicle weight can be reduced, in particular, by way of an integration of attaching and joint functions which relate to the chassis into a vehicle underbody. To this end, it is necessary that the vehicle underbody can absorb a certain amount of chassis loads. Furthermore, it has been recognized by the inventors that the vehicle underbody is then also very suitable for absorbing crash loads, and that therefore other chassis and/or body components can be configured so as to be optionally less flexurally and/or torsionally rigid and therefore of lighter weight. Furthermore, it has been recognized that the integration of additional functions or part functions into a vehicle floor can be realized inexpensively.

One preferred refinement of the apparatus according to the invention is distinguished by the fact that recesses which run transversely with respect to the vehicle longitudinal axis are configured integrally in the underbody, which recesses have the holders for movably attaching chassis links. As a result, the holders for movably attaching chassis links can be realized in an inexpensive and reliable way, for example by bearing sockets or bushes which are aligned with one another being provided on the flanks of the recesses, pairs of which bearing sockets or bushes define a pivot axis of the link to be attached.

A further advantageous refinement of the apparatus according to the invention provides that a depression for receiving a steering gear or steering cylinder is configured integrally, for example is formed, in the underbody. This refinement represents an integration of installation space which affords greater flexibility with regard to the arrangement of the steering gear or steering cylinder and saving of installation space for the arrangement of other vehicle components. In particular, a relatively great spacing between the underbody and the roadway can be achieved or maintained by way of this refinement. In addition, this integral depression results in an improvement in the rigidity of the underbody and therefore of the front vehicle construction, in particular in the vehicle transverse direction. Here, the depression is preferably provided with means, in particular through holes, for fastening the steering gear or the steering cylinder to the underbody. As a result, the vehicle body rigidity is improved further.

According to a further refinement of the apparatus according to the invention, at least one chassis stabilizer is fastened directly to the underbody. This refinement also contributes to an optimization of the absorption capability of operating loads, in particular of chassis loads, and to the increase in the vehicle body rigidity with simultaneous reduction or at least limiting of the vehicle weight.

According to a further refinement of the apparatus according to the invention, a further advantageous functional integration, by way of which a reduction in the vehicle weight and high vehicle body rigidity can be achieved, consists in that at least one additional depression for receiving and/or fixing a vehicle battery, a fluid reservoir, a heat exchanger, a pump or an electronic controller is configured integrally in the underbody.

In order to achieve a low vehicle weight with high vehicle body rigidity, it is advantageous, furthermore, if, according to a further refinement of the apparatus according to the invention, the underbody is provided with reinforcing elements in the form of closed hollow bodies and/or hollow spaces. To this end, for example, elongate recesses or beads are formed in the underbody, into which the hollow bodies are inserted. In order to achieve high shear rigidity, it is proposed, in particular, to configure said hollow bodies and/or hollow spaces in an elongate manner, to be precise in such a way that at least two thereof cross one another and run obliquely with respect to the vehicle longitudinal axis.

It is proposed, furthermore, to provide elements or layers which damp vibrations and/or noise on or between the fibrous layers of the underbody, said elements or layers preferably already being integrated during the manufacture of the underbody. For example, the underbody has a sandwich-like construction which contains an intermediate layer which damps vibrations and/or noise. Here, the intermediate layer is preferably configured only partially, that is to say is provided in one or more predefined area regions of the underbody.

A further advantageous refinement of the apparatus according to the invention is distinguished by the fact that the underbody is divided into at least two sections which, as components which can be assembled separately, abut one another or overlap at a joining region which runs transversely with respect to the vehicle longitudinal axis. The ease of performing repairs is improved as a result.

In order to increase the protective action and service life of the apparatus according to the invention, a further preferred refinement provides that, on its underside, the underbody is provided at least partially with a metal sheet and/or a salt-resistant coating. As a result of the metal sheet which preferably consists of lightweight metal or a thin hardened steel sheet, the strength of the underbody against stone chipping is optimized. Instead of a metal sheet of this type, the underbody can also be provided at least partially on its underside with a reinforcing nonwoven made from inorganic fibers, in particular glass and/or aramid fibers.

Moreover, the apparatus according to the invention can define a moisture exclusion means of vehicle regions (for example, against splash water or the like). The apparatus according to the invention or its underbody then separates a wet region from a dry region of the motor vehicle.

The apparatus according to the invention which is shown in FIG. 1 consists substantially of an underbody 1 for arranging in the front region of a motor vehicle. The underbody 1 is manufactured from fiber-reinforced plastic. It serves, in particular, to protect assemblies and components arranged above it against stone chipping and liquid media. In addition, the underbody 1 serves to ensure high vehicle structural rigidity and vehicle body rigidity and, in particular, to absorb operating and crash loads. To this end, the underbody 1 has, inter alia, three-dimensionally structured regions 1.1, 1.2.

The fiber-reinforced plastic of the underbody 1 contains at least one flat textile structure, for example a woven fabric, roving or mesh made from reinforcing fibers, preferably glass and/or carbon fibers, the flat textile structure being embedded into a matrix made from a thermoplastic or thermosetting plastic. A plurality of layers of a flat textile structure of this type or different flat textile structures made from reinforcing fibers are preferably embedded at least partially in the plastic of the underbody 1 (cf. also FIG. 4). The wall thickness of the underbody 1 preferably lies in the range from 2 to 5 mm, in particular from 3 to 4 mm.

The underbody 1 according to the invention which can also be called a shear area is designed, in particular, to absorb chassis loads and crash loads and has integrated holders 2 for attaching chassis components, preferably for movably attaching single-arm or multiple-arm chassis links. Further integrated holders (not shown here) can be provided for attaching to the vehicle body, preferably to longitudinal carriers (not shown here). The holders 2 are configured or arranged in elongate recesses 1.3, 1.4 which are configured integrally in the underbody 1 and run transversely with respect to the vehicle longitudinal axis or the longitudinal axis of the underbody 1. Pairs of protruding bearing elements which face one another are provided on the flanks of the recesses 1.3, 1.4, which bearing elements have bearing bushes 3 or bearing sockets (through openings) 3 which are aligned with one another.

Moreover, the underbody 1 is provided with attaching means (not shown), for example screw holes, at which it can be fastened to the subframe of the motor vehicle. Furthermore, the underbody 1 can also have attaching elements (not shown) for direct fastening of chassis stabilizer.

The recesses 1.3, 1.4 do not have a uniform depth or profile shape over their length. It can be seen in each case in FIGS. 1 to 3 that the recesses 1.3, 1.4 have their greatest depth at the lateral end of the underbody 1. Accordingly, the bottom 1.31, 1.41 of the recess 1.3, 1.4 rises continuously or gradually from the lateral end of the underbody 1 in the direction of the longitudinal center axis (center) thereof. In the exemplary embodiments which are shown in the drawing, two recess bottom sections 1.311, 1.312 which are aligned with one another together define a saddle-shaped recess bottom 1.31. The shape of the underbody 1, in particular the profile of the recess bottom 1.31, 1.41 therefore corresponds substantially to the force directions of the chassis links (transverse links) which are mounted on the underbody. In FIG. 1, the force directions of the links (not shown) are indicated by way of arrows F and dashed lines.

The fiber orientations of the underbody 1 which is manufactured from fiber-reinforced plastic, the area-specific fiber content and/or the wall thickness of the underbody 1 are adapted in defined area regions to the loads to be expected. For instance, at least in one or more regions, the reinforcing fibers are arranged in a ±45° orientation with respect to the force introduction direction for optimum absorption and transmission of shear forces.

Figure 2:
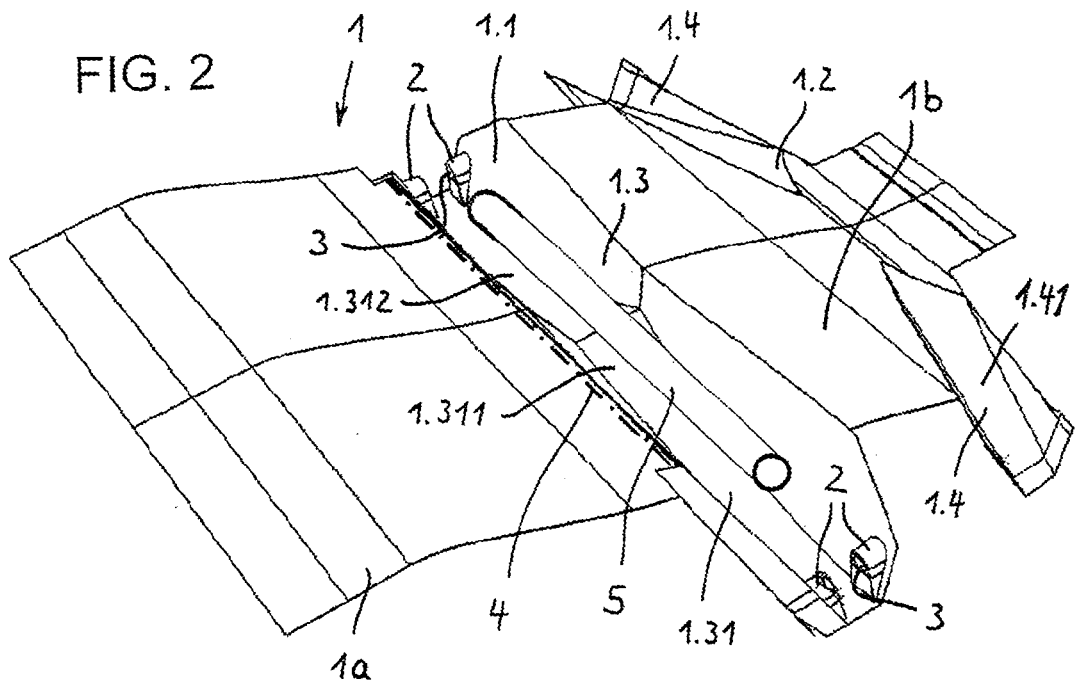
FIG. 2 is a perspective view of an example fiber-reinforced underbody that is employed in the context of a steering cylinder and/or steering gear.
Figure 3:
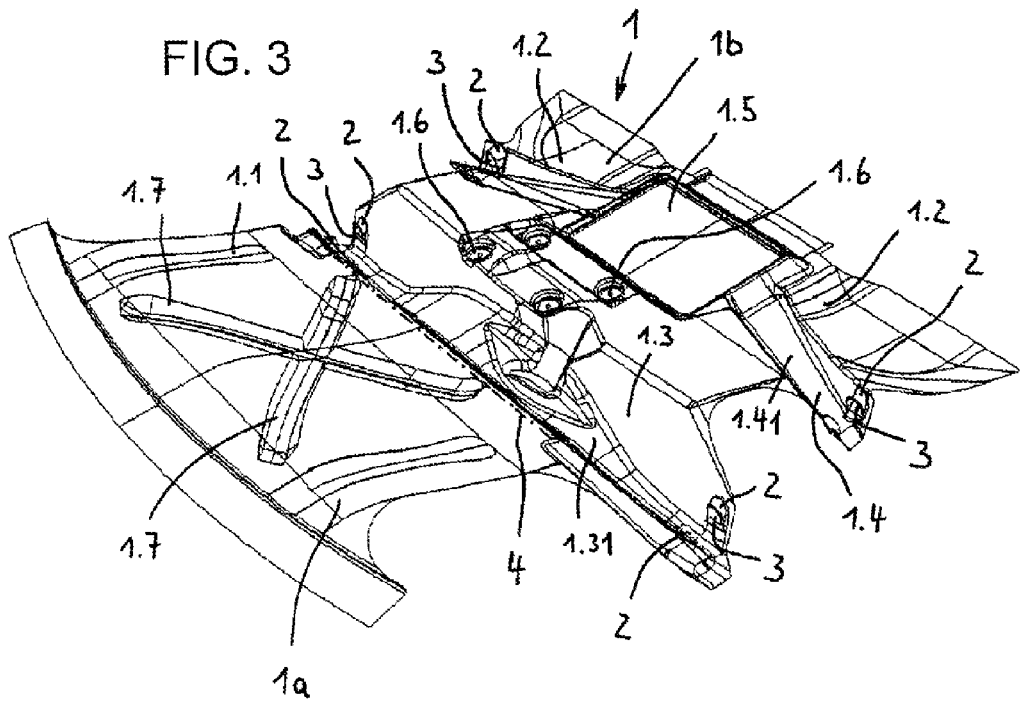
FIG. 3 is a perspective view of an example fiber-reinforced underbody having integral functional areas that are intended to accommodate a vehicle battery, a heat exchanger, a window washing liquid reservoir, and/or other peripheral components.

In order to improve the ease of performing repairs, the underbody 1 according to the invention can be configured in multiple pieces. For example, there can be a division in the front region of the underbody 1. The underbody 1 is preferably divided into two sections 1a, 1b which, as components which can be assembled separately, abut one another or overlap at a joining region 4 which runs transversely with respect to the vehicle longitudinal axis. In FIGS. 1 to 3, a joining or overlapping region 4 of this type is indicated by way of a dash-dotted line.

In the exemplary embodiment which is outlined in FIG. 2, a steering cylinder or steering gear 5 is fastened to the underbody 1. The rigid steering gear attachment which is necessary for optimum driving behavior can therefore be ensured. The steering gear or the steering cylinder 5 is preferably received in the recess-shaped, integrally configured depression 1.3 of the underbody 1.

The exemplary embodiment which is shown in FIG. 3 differs from the examples outlined in FIGS. 1 and 2, in particular, by virtue of the fact that additional functional areas 1.5, 1.6 are integrated into the underbody 1 which serve, for example, to accommodate or incorporate a vehicle battery and/or further peripheral components (not shown), such as a heat exchanger or window washing liquid reservoir.

Furthermore, the underbody 1 which is shown in FIG. 3 has additional reinforcing elements 1.7 for increasing the shear rigidity. For example, foam elements or other structural elements of low density can be introduced for this purpose between at least two fibrous layers of the underbody 1, in order thus to increase the component rigidity in this region by way of a sandwich construction. Hollow spaces, in particular elongate or lattice-shaped hollow spaces, can likewise be provided between at least two fibrous layers in the underbody 1 according to the invention, in order to achieve the same effect.

The front section 1a of the underbody 1 according to FIG. 3 has integrated stiffening elements (reinforcing elements) 1.7 in the form of closed hollow spaces. Here, the hollow spaces are of elongate configuration, cross one another and run obliquely with respect to the vehicle longitudinal axis. Foam cores or hose-shaped or tubular hollow bodies are preferably arranged in the hollow spaces.

Figure 4:
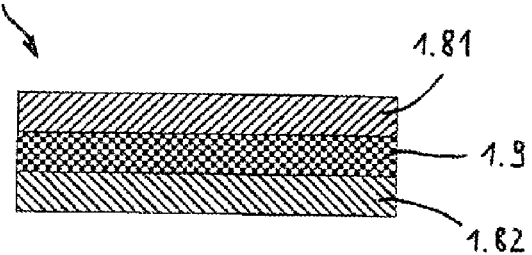
FIG. 4 is a cross-sectional view of an example underbody having two fiber-reinforced plastic outer layers that sandwich an intermediate layer intended to dampen vibrations and/or noise.

FIG. 4 shows one exemplary embodiment of an underbody 1 according to the invention in cross section. It can be seen that the underbody 1 has a sandwich-like construction, an intermediate layer 1.9 which damps vibrations and/or noise being arranged between two covering or outer layers 1.81, 1.82 made from fiber-reinforced plastic. The intermediate layer 1.9 is manufactured, for example, from an elastomer or a different rubber-elastic material. In a further refinement of the underbody 1 according to the invention, the intermediate layer 1.9 is configured partially, that is to say is provided only in one or more predefined area regions of the underbody 1.

The realization of the apparatus according to the invention is not restricted to the exemplary embodiments which are shown in the drawing. Rather, further variants are conceivable which also make use of the invention specified in the appended claims in a design which differs from the drawing. Thus, for example, the underbody 1 can also be provided on its underside at least partially with a metal sheet and/or a salt-resistant coating.

What is claimed is:

1. A protective apparatus positionable in a front or a rear of a motor vehicle, the protective apparatus comprising:
   an underbody comprised of fiber-reinforced plastic for protecting components positioned above the underbody from damage from stone chipping, ground contact, liquid media, and/or other debris, wherein the underbody comprises a first depression integral to the underbody for receiving one of a steering gear or a steering cylinder of the motor vehicle and further comprises three-dimensionally-structured regions that provide rigidity to the underbody, wherein the underbody is capable of absorbing at least one of chassis loads or crash loads; and
   holders integral to the underbody for movably attaching chassis links.

2. The protective apparatus of claim 1 wherein the underbody comprises integral recesses that are transverse to a longitudinal axis of the motor vehicle, wherein the holders are disposed in the integral recesses.

3. The protective apparatus of claim 1 wherein the first depression includes holes for fastening the steering gear or the steering cylinder to the underbody.

4. The protective apparatus of claim 1 further comprising a second depression integral to the underbody, the second depression for receiving a vehicle battery, a fluid reservoir, a heat exchanger, a pump, or an electronic controller.

5. The protective apparatus of claim 1 wherein at least one chassis stabilizer is fastened directly to the underbody.

6. The protective apparatus of claim 1 further comprising reinforcing elements secured to or integral with the underbody, with the reinforcing elements comprising at least one of closed hollow bodies or hollow spaces.

7. The protective apparatus of claim 6 wherein the underbody comprises elongate recesses into which the closed hollow bodies and/or hollow spaces are inserted.

8. The protective apparatus of claim 6 wherein the closed hollow bodies and/or hollow spaces have an elongate configuration, wherein at least two of the hollow bodies and/or hollow spaces cross one another and are oblique to a longitudinal axis of the motor vehicle.

9. The protective apparatus of claim 1 wherein the underbody comprises an intermediate layer disposed between two outer layers, with the intermediate layer dampens at least one of vibrations or noise.

10. The protective apparatus of claim 1 wherein the underbody is comprised of two sections that are separable from one another, wherein the two sections either abut one another or overlap with one another at a joining region that is transverse to a longitudinal axis of the motor vehicle.

11. The protective apparatus of claim 1 further comprising at least one of a metal sheet or a salt-resistant coating disposed on an underside of the underbody.

12. A protective apparatus securable to a motor vehicle for protecting components exposed along an underside of the motor vehicle from damage from stone chipping, ground contact, liquid media, and/or other debris, the protective apparatus comprising:
- an underbody of fiber-reinforced plastic comprising a left section and a right section that either abut or adjoin one another at a recess that is disposed at or near a middle of the underbody and is configured to be substantially aligned with a longitudinal axis of the motor vehicle, wherein the underbody is configured to absorb at least one of chassis loads or crash loads;
- holders in the underbody to which one or more chassis links is securable;
- a depression in the underbody for receiving a vehicle battery, a fluid reservoir, a heat exchanger, a pump, or an electronic controller; and
- at least one hollow body or hollow space in the underbody that has an elongate configuration and reinforces the underbody,
- wherein the left and right sections of the underbody are comprised of at least three layers, one of which is an intermediate layer for dampening vibration and/or noise.

13. The protective apparatus of claim 12 wherein the recess is configured to receive a steering gear or a steering cylinder.

14. The protective apparatus of claim 12 wherein the at least one hollow body or hollow space includes at least two hollow bodies or hollow spaces that cross one another and are configured to be oblique to the longitudinal axis of the motor vehicle.

15. The protective apparatus of claim 12 further comprising at least one of a metal sheet or a salt-resistant coating disposed on an underside of the underbody.

16. A protective apparatus securable to a motor vehicle for protecting components exposed along an underside of the motor vehicle from damage from stone chipping, ground contact, liquid media, and/or other debris, the protective apparatus comprising:
- an underbody of fiber-reinforced plastic comprising a left section and a right section that either abut or adjoin one another at a recess that is disposed at or near a middle of the underbody and is configured to be substantially aligned with a longitudinal axis of the motor vehicle, wherein the underbody is configured to absorb at least one of chassis loads or crash loads; and
- at least one hollow body or hollow space in the underbody that has an elongate configuration and reinforces the underbody,
- wherein the left and right sections of the underbody are comprised of at least three layers, one of which is an intermediate layer for dampening vibration and/or noise.

* * * * *